United States Patent [19]
Leinen

[11] Patent Number: 5,437,305
[45] Date of Patent: Aug. 1, 1995

[54] FLOW CONTROL VALVE

[75] Inventor: Chris M. Leinen, Houston, Tex.

[73] Assignee: Forward Spin Technologies, Inc., Houston, Tex.

[21] Appl. No.: 299,998

[22] Filed: Sep. 1, 1994

Related U.S. Application Data

[60] Continuation-in-part of Ser. No. 108,394, Aug. 18, 1993, abandoned, which is a division of Ser. No. 949,459, Sep. 22, 1992, Pat. No. 5,287,889.

[51] Int. Cl.⁶ .............................................. F16K 5/10
[52] U.S. Cl. .............................. 137/625.32; 251/127
[58] Field of Search ................. 137/625.3, 625.32; 251/127

[56] References Cited

U.S. PATENT DOCUMENTS

| | | |
|---|---|---|
| 223,573 | 1/1880 | Ainsworth et al. . |
| 1,333,048 | 3/1920 | Webster . |
| 2,911,009 | 11/1959 | Parker ............... 137/625.41 |
| 3,023,783 | 3/1962 | Vickery . |
| 3,443,793 | 5/1969 | Hulsey . |
| 3,665,965 | 5/1972 | Baumann . |
| 3,826,281 | 7/1974 | Clark . |
| 3,880,191 | 4/1975 | Baumann ............ 137/625.32 |
| 3,941,350 | 3/1976 | Kluczynski . |
| 3,960,177 | 6/1976 | Baumann ............ 137/625.31 |
| 3,974,860 | 8/1976 | Stead et al. . |
| 4,085,774 | 4/1978 | Baumann . |
| 4,212,321 | 7/1980 | Hulsey . |
| 4,226,263 | 10/1980 | Muchow ............ 137/614.17 |
| 4,364,415 | 12/1982 | Polon . |
| 4,479,510 | 10/1984 | Bey . |
| 4,530,375 | 7/1985 | Bey . |
| 4,540,025 | 9/1985 | Ledeen et al. . |
| 4,610,273 | 9/1986 | Bey . |
| 4,691,894 | 9/1987 | Pyotsia et al. . |
| 4,774,984 | 10/1988 | Peters . |
| 4,889,163 | 12/1989 | Engelbertsson . |
| 5,070,909 | 12/1991 | Davenport . |
| 5,116,019 | 5/1992 | Rohweder et al. . |
| 5,193,583 | 3/1993 | Gethmann et al. . |
| 5,287,889 | 2/1994 | Leinen ................ 137/625.3 |

FOREIGN PATENT DOCUMENTS

| | | |
|---|---|---|
| 1050164 | 1/1954 | France . |
| 2359717 | 6/1975 | Germany . |

OTHER PUBLICATIONS

Masoneilan Dress Varimax Valve 25000 Serial LO-T Control Valve Brochure Noise Attenuation Options for 40000 Series Control Valves.

Q-Ball—Quien Metal Seated Rotary Control Valve.

Primary Examiner—John C. Fox
Attorney, Agent, or Firm—Pravel, Hewitt Kimball & Krieger

[57] ABSTRACT

A valve includes a body having a valve element positioned therein. The valve element includes a bore therethrough, which is selectively alignable with bores through the valve body. As the valve element is moved to position the valve element bore in an askew position with respect to the valve body bores, flow eddies or turbulence may form and result in vibration and/or noise. The valve includes a plurality of diffusers which break up the flow to reduce the noise and/or vibration. Additionally, a secondary flow passage may be disposed between the valve element bore and the outlet bore of the valve body, to permit a portion of the flow through the valve to pass therethrough as the valve element is rotated to throttle the flow through the valve.

16 Claims, 2 Drawing Sheets

FLOW CONTROL VALVE

RELATED APPLICATIONS

This is a continuation in part of U.S. patent application Ser. No. 08/108,394, filed Aug. 18, 1993, now abandoned, which is a divisional of U.S. patent application Ser. No. 07/949,459, filed Sep. 22, 1992 now U.S. Pat. No. 5,287,889.

BACKGROUND OF THE INVENTION

1. Field of the Invention

The present invention relates to flow control valves. More particularly, the invention relates to throttling valves such as those used in the natural gas pipeline industry, which must be capable of minimally restricting flow therethrough during peak gas flow rates therethrough, and must be further capable of restricting the flow therethrough during periods of lower natural gas demand without causing undesirable noise and/or vibration in the valve.

2. Background of the Art

Flow control valves are used to throttle the flow of fluids, including gases, through pipes and pipelines. The valve typically includes a body into which the opposed ends of the pipe are received, and a valve element received within the body and having a flow passage therethrough which is selectively alignable with the pipe ends to permit, or restrict, flow through the valve. During periods of high pipeline demand, such as the winter months where the pipeline is a natural gas pipeline, the valve element is positioned to provide minimal restriction to gas flow. During nonpeak months, such as during summer where gas demand is low, the valve element is positioned to provide a substantial restriction to the gas flow through the valve.

One problem associated with the throttling of pipeline flows with valves is the occurrence of "noise" which is caused by vibration in the valve and pipe caused by valve induced shear turbulence and vortices formed in the fluid passing through the valve. In a typical ball valve arrangement, the valve element is a spherical member having a cylindrical bore therethrough. The body of the valve likewise includes cylindrical inlet and outlet passages therethrough, which are selectively alignable with the valve element passage by rotating the valve element. When the valve element is rotated to move the valve element passage from a fully aligned position with the inlet and outlet passages in the body to a less aligned position, the fluid flowing through the valve must change direction because the flow path through the valve element passage is at an angle to the flow path through the inlet and outlet passages of the body and the flow passage through the pipe. Additionally, a portion of the valve element body extends into the flow path at the valve inlet and presents a reduced cross-section flow path for the fluid flowing through the valve. This reduced area causes the fluid to accelerate into the valve element while fluid stream loses pressure, i.e., the fluid expands as it enters the valve element. These changes are non-uniform in the flow path through the valve, because portions of the fluid flow are not directly affected by the movement of the ball to alter the flow path through the ball, whereas other portions of the fluid stream are substantially effected. As a result, shear occurs within the fluid stream where high pressure, low velocity portions of the fluid stream contact high velocity, low pressure fluid stream areas through the valve. This shear can induce noise in the valve which can destroy the valve or render it unsuitable for use in noise sensitive areas.

SUMMARY OF THE INVENTION

The present invention is a flow control valve for throttling flows through a pipeline. The valve includes a valve body having an inlet and an outlet flow passage, and a valve element received in the valve body and having a flow passage therethrough, wherein the inlet flow passage, outlet flow passage and the valve element flow passage form a variable flow path through the valve. A plurality of flow conditioning members are disposed in the flow path to provide minimal restriction to the flow through the valve when the valve is in the fully open position, and to condition the flow through the valve as the valve element is rotated to a closed position and thereby reduce the incidence of vibration in the valve. Preferably, the flow control members are diffusers, and a diffuser is positioned in the inlet bore of the valve body opposite a diffuser on the entry side of the valve element, and a diffuser is positioned at the outlet of the valve element opposite to the diffuser on the entry side of the valve element. As the valve is closed, the flow diffusers on the inlet side of the valve element and inlet bore provide a smaller flow area at the inlet side of the valve, than the flow area past the diffuser at the outlet of the valve element. The larger flow area on the downstream side of the valve allows the expanded fluid to more freely flow through the valve, while the pressure in the valve element immediately downstream of the inlet diffusers is increased by the downstream diffuser, and thus tends to balance or match the pressure drop at the inlet and the outlet of the valve element to enable reduced noise and/or vibration.

In an alternative embodiment of the invention, the valve element also includes a secondary flow passage selectively communicable between the valve element bore and the downstream side of the valve body. This secondary passage may be combined with an enlarged downstream flow diffuser, to provide a larger flow area in the downstream side of the valve element while the enlarged downstream diffuser increases the pressure downstream of the inlet diffusers and thereby tends to balance the pressure drop at the inlet and outlet to the valve element.

These, and other features of our invention will be apparent from the following description of the embodiments, when read in conjunction with the following drawings, wherein:

DESCRIPTION OF THE PREFERRED EMBODIMENT

Figure 1:
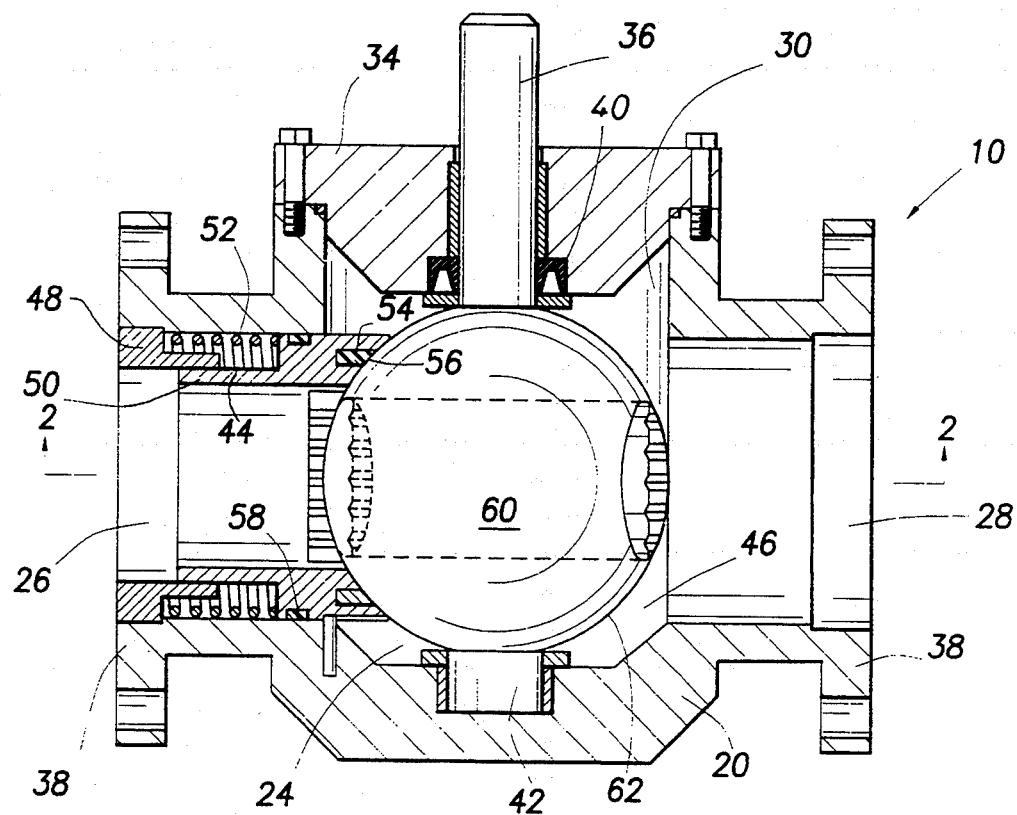
FIG. 1 is a sectional view of a valve of the present invention.

Referring generally to FIG. 1, the present invention is a valve 10, having a body portion 20 with a valve element portion 60 received therein. As shown in FIG. 1 in the preferred embodiment of the invention the valve 10 is a ball valve, although other valve element, and thus valve style configurations, such as conical, cylindrical, plug or tapered valve element structures, are specifically contemplated by the present invention. The configuration of the valve 10 shown and described herein is preferred for use in natural gas pipeline applications, where natural gas and occasional particulate, gas, liquid or vapor contaminants must be flowed through a pipeline for delivery to residential, industrial, utility and other gas users. The valve 10 must be capable of allowing maximum flow and minimal pressure drop therethrough during periods of peak demand, and lower flow with a substantial pressure drop therethrough during periods of low demand and with low noise or vibration generation.

The valve body 20 conventionally includes a central cavity 24 within which the valve element 60 is received and into which an inlet passage 26, an outlet passage 28 and an access passage 30 extend. Each of the inlet and outlet passages 26, 28 include a flange 32 at the outermost ends thereof, for connection of the valve 10 to flanged pipe. The access bore 30 includes a bonnet 34 thereover, through which a valve stem 36 is extended into communication with the valve element 60. The stem 36 is received within the bonnet 34 in a conventional sealing packer arrangement 40 to allow rotation of the stem 36 within the bonnet 34 but prevent leakage through the bonnet 34 past the stem 36. A bearing assembly 42, or trunnion, is received within the central cavity 24 at the base thereof, to rotationally support the valve element 60 within the central cavity 24.

The inlet passage 26 of the body 20 is preferably sleeved with a spring loaded inlet seal member 44. The seal member 44 includes a fixed end piece 48 disposed adjacent the outer end of the inlet passage 26 of the body, and a spring actuated tubular sealing member 50 biased inwardly from the end of the passage 26 by a spring 52. A circular seal 54, having a frustroconical sealing face 56 thereon, is disposed on the inner terminal end of the tubular sealing member 50 to seal against the outer surface of the valve element 60, and an outer seal ring 58 is disposed on the outer surface of the sealing member 50 to seal the outer diameter of the sealing members with the inner diameter of the inlet passage 26. The spring loaded seal member 50, in conjunction with the seals 54, 58, ensures maintenance of a seal between the body 20 and the valve element 60.

Figure 2:
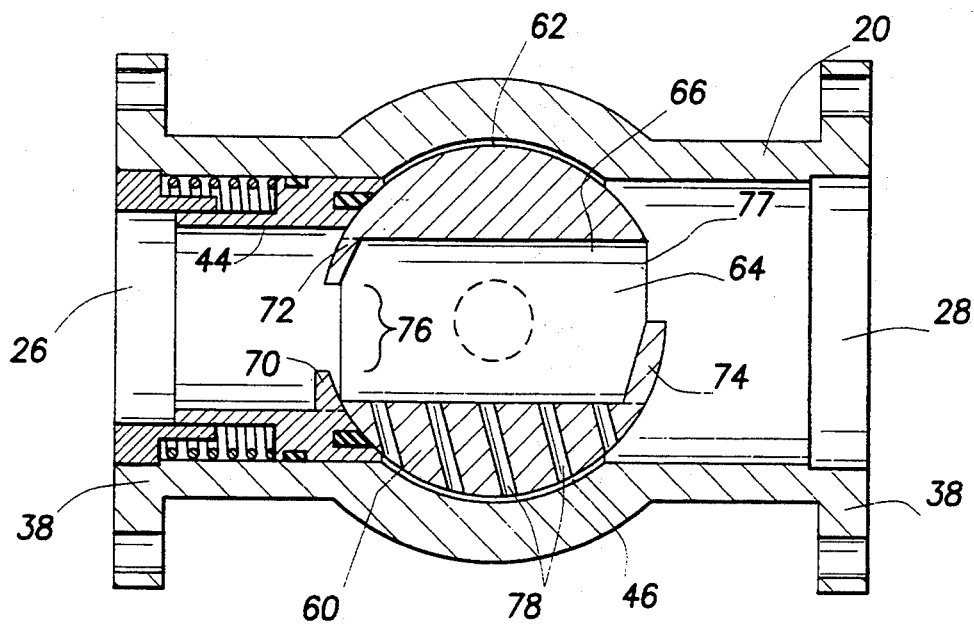
FIG. 2 is a sectional view of the valve of FIG. 1 at section 2—2.

Referring now to FIGS. 1 and 2, the valve element 60 is preferably conventionally configured as a ball or spherical element, having a spherical outer surface 62 and a valve passage 64 extending therethrough. The outer spherical surface 62 of the valve element 60 is sized to create an annular gap 46 between the inner wall of the body 20 and the valve element 60.

Figure 3:
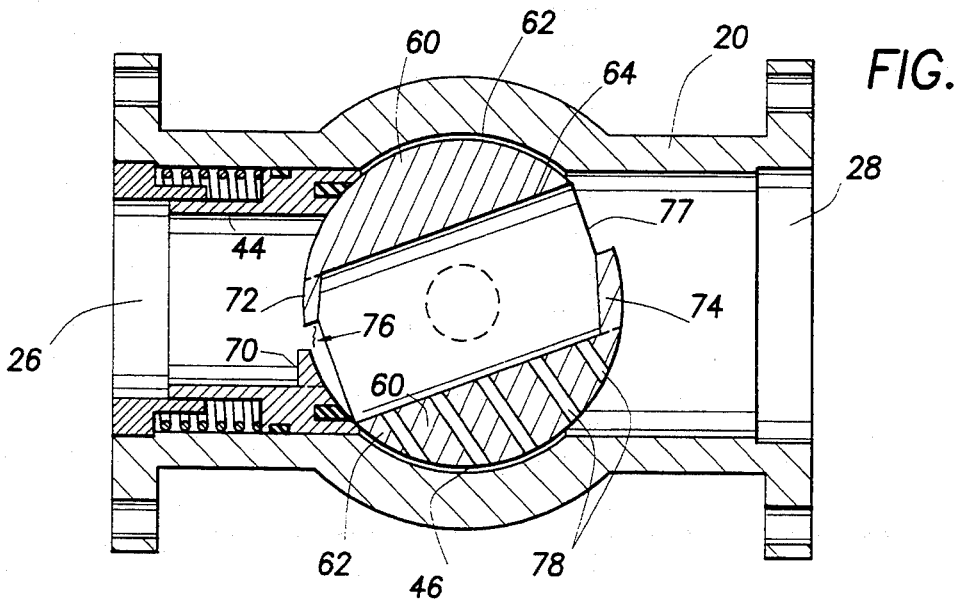
FIG. 3 is a sectional view of the valve of FIG. 1 at section 2—2 with the valve element positioned to restrict the flow through the valve.

Referring now to FIGS. 2 and 3, the inlet and outlet passages 26, 28 of the body 20, in conjunction with the valve passage 64, provide a variable flow passage 66 through the valve 10. In FIG. 2, the flow passage 66 is shown in its maximum cross-section, minimum restriction position, whereas in FIG. 3, the flow passage 66 is partially restricted by the rotation of the valve element 60 within the body 20. The valve element 60 may be further rotated to completely disrupt communication between the inlet bore 26 and the valve passage 64, and thus prevent passage of fluids through the valve 10.

Referring still to FIG. 2 and 3, the valve element 60 and the inlet bore 26 of the valve body 20 further include flow conditioning members or attenuators useful for changing the characteristics of the fluid flow though the valve 10 and thereby reduce or attenuate noise generated within the valve 10. In the preferred embodiment of the invention, these attenuators include: An inlet passage diffuser 70 extending inwardly of the inlet passage 26 from the inlet passage wall; a valve passage inlet diffuser 72 extending inwardly of the valve passage 64 and terminating within the valve passage 64 and also disposed on a diametrically opposed side of the flow passage 66 through the valve 10 from the position of the inlet passage diffuser 70; and a valve passage outlet diffuser 74 extending inwardly of the valve passage 64 and terminating inwardly of the wall of the valve passage 64 and also disposed on the diametrically opposed side of the flow passage 66 through the valve 10 from the valve passage inlet diffuser 72. The diffusers 70, 72 and 74 provide little impedance to fluid flow through the flow passage 66 when the valve 10 is in the fully opened position as shown in FIG. 2, but increasing resistance to fluid flow through the flow passage 66 as the valve element 20 is moved to the restricting positions, one of which is shown in FIG. 3. Additionally, the valve element 60 includes at least one, and preferably a plurality of, secondary flow passages 78 that are communicable between the valve passage 64 and the body outlet passage 28. Preferably a spherical gap 46 is provided on the downstream side of the seal 54, and fluid flowing through the valve 10 and into the valve passage 64 will partially flow through the passages 78 and the spherical gap 46 to the valve outlet 26.

As discussed previously, noise is generated in the valve by the shear forces generated because different portions of the fluid flow through the valve experience different pressure drops, and thus different velocity changes, when entering or exiting the valve element 60. Preferably, the effective area of the flow stream blocked by the diffuser 74 is equal to, or slightly smaller than, the combined effective area of the flow stream blocked by the diffusers 70 and 72, regardless of the position of the valve element 60 in the body 20. Thus, the effective area of the inlet orifice 76, as defined as the space existing between the diffusers 70, 72, is smaller than, or equal to, the effective area of the exit orifice 77 at the outlet of the valve element 60, as defined as the space between the outer edge of the diffuser 74 and the opposed wall of the valve passage 64 and the outlet 28. Where the effective areas of the orifices 76, 77 are approximately equal, or the outlet orifice 77 is smaller than the inlet orifice 76, the secondary passages 78 are necessary to ensure that the cross-sectional area for flow on the downstream side of the valve element 60 exceeds that of the upstream area, because where the fluid is a gas, it will expand at the inlet to the valve passage 64. Otherwise, the control of the flow through the valve could change between the inlet and outlet sides of the valve element 60 as the valve 10 is closed, resulting in unexpected flow changes in the valve 10 due to the different flow characteristics and capacities of the orifice 76 and the orifice 77/passage 78 combination.

Preferably, in the fully open position of the valve as shown in FIG. 2, the effective flow area of the inlet orifice 76, and of the outlet orifice 77, are approximately 66% of the effective area of the flow area of the unrestricted portion of the inlet 26. Other relative flow areas, in the range of inlet or outlet orifice 76, 77 effective flow areas of 50% to 90% of the unrestricted inlet effective flow area, are specifically contemplated.

Referring now to FIG. 2, the diffusers 70, 72 and 74 are positioned to have the least affect, or impedance, on the flow through the valve 10 in the fully open position. The flow through the center region of the orifice 76 is relatively unchanged from that of the positioning of the elements of FIG. 2, but the diffusers 70, 72 break portions of the fluid stream into smaller fluid streams, each of which experiences its own pressure drop. When the fluid stream reaches the outlet 28 end of the valve element 60, the diffuser 74 also separates a portion of the fluid stream into separate fluid streams experiencing individual pressure drops, and also forms a flow impediment which increases the pressure within the valve passage 64 to decrease the pressure drop at the inlet of the valve element 60 and thereby redistribute the pressure drop at the inlet and outlet of the valve element.

The lower individual pressure drops enabled by separating the pressure drop into two regions, in conjunction with the separation of the fluid stream into multiple smaller streams at the diffusers 70, 72 and 74, enables reduced noise and vibration over the entire operating range of the valve 10. It is contemplated that with the relative sizes of the diffuser 70, 72 and 74, and the use of the secondary passages 78, the pressure drop at the inlet to the valve element 60 may be maintained at between approximately 60% to 70% of the total pressure drop in the valve 10, with the remaining 30% to 40% of the pressure drop occurring at the outlet of the valve element 60. Preferably the valve element outlet diffuser 74 extends further inwardly of the valve passage 64 than the valve element inlet diffuser 72. Thus, the outlet diffuser 74 will diffuse a portion of the flow stream adjacent the center of the valve inlet passage 26 and of the valve passage 64 to affect the aforementioned redistribution of the pressure drop through the valve 10. Further, by spacing the diffusers 72, 72 at opposite ends of the valve passage 64 through the valve element 60, a large, unrestricted flow path is provided within the valve passage 64 to enable high flow rates through the valve passage 64, particularly when the valve element 20 is in the fully open position as shown in FIG. 2.

Referring now to FIG. 3, the valve element 60 is shown in the partially closed position, wherein the diffusers 70, 72 and 74 block a substantial portion of the flow stream. As the flow stream enters the reduced gap 76 between the diffusers 70, 72, the fluid will accelerate and experience a pressure drop. The center of the fluid stream moves at the highest velocity through the orifice 76, and the diffusers 70, 72 break up the fluid stream passing therethrough to create a low velocity stream passing therethrough. By slowing the flow of the fluid stream adjacent the surface of the valve passage 64 wall with the diffusers 70, 72, vortices, and the incidence of high velocity fluid streams coming into contact with low velocity fluid streams, are greatly diminished and thus noise and vibration are reduced. Additionally, the valve outlet diffuser 74 creates a pressure increasing restriction at the outlet to the valve passage 64, and the outlet diffuser 74, in conjunction with adjacent surfaces of the valve passage 64, interfere with the flow of the high velocity central portion of the flow stream passing through the unrestricted orifice 76 portion of the inlet side of the valve passage 64. Thus, the pressure within the valve passage 64 is increased by the downstream or valve outlet diffuser 74. By increasing the pressure within the valve passage 64, the pressure drop through the valve element 60 may be redistributed to occur in both the inlet and the outlet to the valve element 60, allowing a more uniform velocity profile and pressure recovery of the gas exiting the valve 10.

Figure 4:
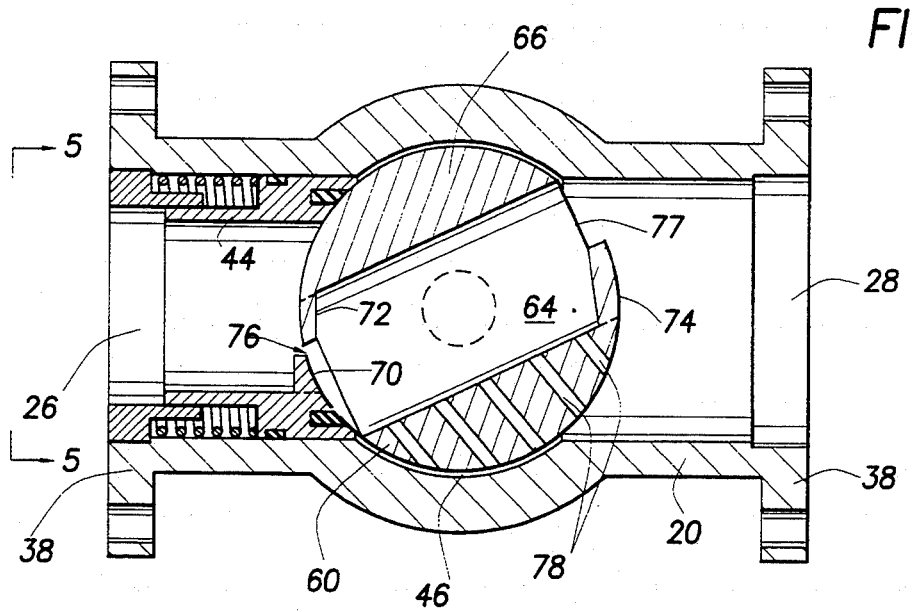
FIG. 4 is a sectional view of the valve of FIG. 1 at section 2—2, with the valve element positioned to further restrict the flow through the valve as compared to the position of the valve in FIG. 3.

Referring now to FIG. 4, the valve element 60 has been further rotated from the position of FIG. 3 to cause the diffusers 70, 72 to extend across the entire fluid stream entering the valve. In this position, the entire flow stream entering the valve passage 64 is broken down into several smaller streams, which induces little vibration in the valve 10. The fluid then passes through the outlet diffuser 74, causing further distribution of the flow stream into smaller flow streams while increasing the backpressure within the valve passage 64 and thereby more evenly distributing the pressure drop through the valve passage 64 between the inlet and outlet sides of the valve passage 64.

By varying the size of the outlet diffuser 74 and the total cross-section and number of the secondary flow passages 78 exposed to the outlet 28 in any position of the valve element 60, the valve designer may modify the relative pressure drop and flow diverting effects through the valve 10 to optimize the pressure drop and noise characteristics of the valve 10. Preferably, the effective flow area on the downstream side of the valve element 60 is always greater than the effective area of the flow path at the upstream side of the valve element 60.

Figure 5:
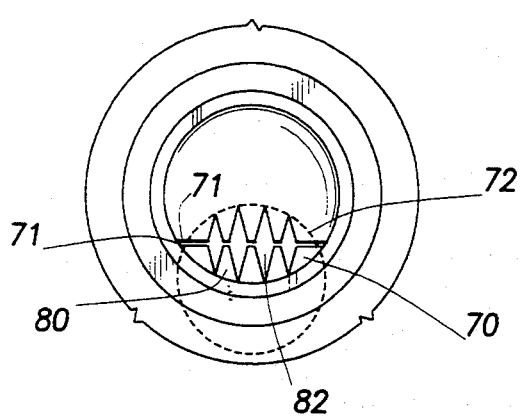
FIG. 5 a partial end view of the valve of FIG. 4, showing the arrangement of the diffusers.
Figure 6:
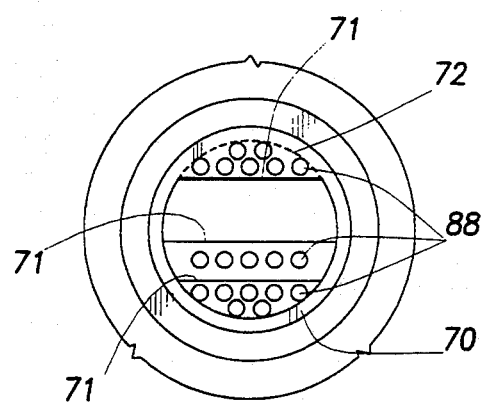
FIG. 6 is a partial end view of the valve of FIG. 2, showing an alternative configuration of the diffusers.

Referring now to FIGS. 5 and 6, two contemplated configurations of the diffusers are shown. In FIG. 5, the diffuser 70, 72 are shown with the valve element 60 in the position of FIG. 4, wherein substantially all of the flow through the valve is routed through the diffusers 70 and 72. Each diffuser 70, 72, as well as the diffuser 74 (not shown in this Figure) includes a substantially semicircular extending portion of the adjacent flow passage surface (inlet bore 28 or valve passage 64) terminating in a generally flat ledge 71, and a plurality of extending teeth or tines 80 having corresponding gaps 82 therebetween. Preferably, the tines 80 align on the inlet side diffusers 70, 72, so that the gaps 82 are aligned to enable flow therethrough as the inlet diffusers are brought into an adjacent position as shown in FIG. 5. As the valve element 60 is closed beyond the position of FIG. 5, the valve element inlet diffuser 72 will pass behind the inlet passage diffuser 70, such that small rhombodial flow areas will be defined at the valve element inlet by the meshing of the gaps 82 to enable flow through the valve until the valve element is actuated to its fully closed position. In one alternative to this construction, as shown in FIG. 6, the diffusers 70, 72 and 74 include a plurality of through holes 88 therethrough. The gaps 82, or the holes 88, separate the flow through the diffusers 70, 72 and 74 into smaller flow streams, such that the pressure drop of the fluid stream is separated into multiple pressure drops through multiple fluid streams, to reduce the overall noise or vibration inducing effect of the pressure drop.

Preferably, in one embodiment of the invention the diffusers 70 and 72 are sized, in relation to diffuser 74, such that the positioning of the valve element 60 to position the diffusers 70, 72 to completely span the flow passage 66 as shown in FIG. 5 will simultaneously position the valve element outlet diffuser 74 to span the flow passage 66 at the valve element outlet. Thus, in that one embodiment of the invention the height of the outlet diffuser 74 is preferably at least equal to the combined height of the diffusers 70, 72 on the inlet side of the valve 10, as measured across the greatest extension or height of the diffusers from their respective passages. However, it is specifically contemplated that other relative sizes of the diffusers may be incorporated without deviating from the scope of the invention.

Although the invention has been described herein in terms of a ball valve element, other valve element 60 configurations are specifically contemplated. Likewise, although the preferred embodiment is described in terms of multiple diffusers 70, 72 and 74 and additional flow passages 78, other elements may be used to distribute the pressure drop within the valve 10.

I claim:

1. A valve for throttling flows through pipelines, comprising:
    a valve body having an inlet flow passage and an outlet flow passage therethrough;
    a valve element received in said body and having a valve element passage therethrough, said valve element passage selectively alignable with said body inlet and body outlet passages;
    an inlet flow diffuser extending from a wall of said inlet flow passage and terminating inwardly of said inlet flow passage wall;
    a valve element inlet flow diffuser extending from wall of said valve element passage in a position diametrically opposed to said inlet flow diffuser;
    a valve element outlet flow diffuser extending inwardly from said valve element passage at a position diametrically opposed to said valve element inlet flow diffuser and terminating inwardly of said valve element passage;
    each said diffuser defining an effective area; and
    the effective area of said valve element outlet flow diffuser is no larger than the combined effective area of said inlet flow diffuser and said valve element inlet flow diffuser.

2. The valve of claim 1 further including a secondary flow passage selectively communicable between said valve element passage and said outlet flow passage.

3. The valve of claim 2, wherein said valve element passage includes an inlet end and an outlet end;
    said valve element inlet flow diffuser located adjacent said inlet flow passage and, in combination with said inlet flow diffuser, providing a first effective flow area through said inlet end;
    said valve element outlet flow diffuser located adjacent to said outlet flow passage and providing a second effective flow area through said outlet end; and
    said first effective flow area is less than the combined effective flow area of said second effective flow area and a secondary flow area of said secondary flow passage.

4. The valve of claim 1, wherein said valve element passage includes an inlet end and an outlet end; and
    said diffusers cause the flow passing through the valve to experience a first pressure drop at said inlet end and a second pressure drop at said outlet end, and said second pressure drop is less than said first pressure drop.

5. The valve of claim 4, wherein said first pressure drop is 60 to 70 percent of a total pressure drop through said valve element.

6. The valve of claim 4, wherein said second pressure drop is 30 to 40 percent of a total pressure drop through said valve element.

7. The valve of claim 1, wherein said valve element outlet flow diffuser extends further inwardly of said valve element passage than said inlet flow diffuser.

8. The valve of claim 7, wherein said inlet flow diffuser includes at least one aperture.

9. The valve of claim 8, wherein said valve element inlet flow diffuser includes at least one aperture; and
    wherein said apertures in said inlet flow diffuser and in said valve element inlet flow diffuser align to provide an inlet diffuser flow passage through said flow diffusers as said diffusers close a flow path through said valve.

10. The valve of claim 9, wherein said inlet flow diffuser and said valve element inlet flow diffuser each terminate at a generally linear ledge; and
    each of said apertures is a slot extending inwardly of said generally linear ledges.

11. The valve of claim 10, wherein a rhomboidal flow area is provided through said apertures in said inlet flow diffuser and said valve element inlet flow diffuser as said valve element is moved to a closed position.

12. The valve of claim 11, wherein said apertures separate a flow stream through the valve into a plurality of separate flow streams.

13. The valve of claim 1, wherein said valve element outlet flow diffuser includes at least one aperture.

14. The valve of claim 13, wherein said at least one aperture in said valve element outlet flow diffuser separates a flow stream reaching said valve element outlet flow diffuser into a plurality of flow streams as it passes therethrough.

15. The valve of claim 13, wherein said at least one aperture is a hole through said valve element outlet flow diffuser.

16. The valve of claim 1, wherein upon positioning of said valve element to position said valve element inlet flow diffuser to, in combination with said inlet flow diffuser, span an inlet end of said valve element passage, said valve element outlet flow diffuser spans an outlet end of said valve element passage.

* * * * *